US010111122B2

(12) United States Patent
Chincholi et al.

(10) Patent No.: US 10,111,122 B2
(45) Date of Patent: Oct. 23, 2018

(54) COLLABORATIVE SENSING USING COORDINATED SILENCING OF USER EQUIPMENT IN LICENSE-EXEMPT BANDS

(75) Inventors: Amith V. Chincholi, Sunnyvale, CA (US); Joseph M. Murray, Schwenksville, PA (US); Martino Freda, Laval (CA); Alpaslan Demir, Melville, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 589 days.

(21) Appl. No.: 14/115,586

(22) PCT Filed: May 2, 2012

(86) PCT No.: PCT/US2012/036133
§ 371 (c)(1),
(2), (4) Date: Mar. 14, 2014

(87) PCT Pub. No.: WO2012/151284
PCT Pub. Date: Nov. 8, 2012

(65) Prior Publication Data
US 2014/0199992 A1 Jul. 17, 2014

Related U.S. Application Data

(60) Provisional application No. 61/481,957, filed on May 3, 2011, provisional application No. 61/601,264, filed on Feb. 21, 2012.

(51) Int. Cl.
*H04W 4/00* (2018.01)
*H04W 24/10* (2009.01)
(Continued)

(52) U.S. Cl.
CPC .......... *H04W 24/10* (2013.01); *H04W 16/14* (2013.01); *H04W 36/0088* (2013.01); *H04W 84/045* (2013.01)

(58) Field of Classification Search
CPC .... H04W 24/10; H04W 16/14; H04W 84/045
(Continued)

(56) References Cited

U.S. PATENT DOCUMENTS

2009/0135744 A1* 5/2009 Chaudhri .............. H04W 16/14
370/278
2009/0186646 A1 7/2009 Ahn et al.
(Continued)

OTHER PUBLICATIONS

Shen, Bin, "User Clusters Based Hierarchical Cooperative Spectrum Sensing in Cognitive Radio Networks", IEEE, Proceedings of the 4th International Conference on Crowncom, Jun. 22-24, 2009, 6 pages.
(Continued)

*Primary Examiner* — Chuck Huynh
(74) *Attorney, Agent, or Firm* — Condo Roccia Koptiw LLP

(57) ABSTRACT

Systems, methods, and instrumentalities are disclosed to schedule user equipment (UE) measurements. An HeNB may identify a first cluster of UEs and a second cluster of UEs. The HeNB may determine a measuring gap schedule relating to the first cluster of UEs and the second cluster of UEs. The measuring gap schedule may indicate a measurement time for each cluster. The measurement time may indicate that UEs in a cluster withhold a transmission during the measurement time. The UEs in the cluster may measure a spectrum (e.g., frequency, channel, etc.) associated with a supplementary cell during the measurement time. The HeNB may send the measuring gap schedule to the first cluster of UEs and the second cluster of U Es. The HeN B may receive spectrum measurements of the supplementary
(Continued)

cell from the first cluster of UEs and the second cluster of UEs, e.g., in accordance with the measuring gap schedule.

20 Claims, 22 Drawing Sheets

(51) Int. Cl.
    *H04W 16/14*     (2009.01)
    *H04W 84/04*     (2009.01)
    *H04W 36/00*     (2009.01)

(58) Field of Classification Search
    USPC .......................... 455/422.1, 444, 452.1, 454
    See application file for complete search history.

(56) References Cited

U.S. PATENT DOCUMENTS

| | | | |
|---|---|---|---|
| 2009/0239533 A1* | 9/2009 | Somasundaram ... | H04J 11/0093 455/434 |
| 2009/0304110 A1 | 12/2009 | Choi et al. | |
| 2011/0014936 A1 | 1/2011 | Kim | |
| 2011/0255431 A1* | 10/2011 | Wang .................... | H04L 5/0053 370/252 |
| 2012/0281637 A1* | 11/2012 | Junell .................. | H04W 16/14 370/329 |

OTHER PUBLICATIONS

Federal Communications Commission, "Second Memorandum Opinion and Order", FCC10-174, Washington, D.C., Sep. 23, 2010, 88pages.

3rd Generation Partnership Project (3GPP), TS 36.300, V10.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) ", Dec. 2010, 200 pages.

3rd Generation Partnership Project (3GPP), TS 36.331, V10.1.0, "3rd Generation Partnership Project; Technical Specification Group Radio Access Network; Evolved Universal Terrestrial Radio Access (E-UTRA); Radio Resource Control (RRC); Protocol specification (Release 10) ", Mar. 2011, 290 pages.

3rd Generation Partnership Project (3GPP), TS 36.133, V10.1.0, "3rd Generation Partnership Project; Technical Specification Group Radio Access Network; Evolved Universal Terrestrial Radio Access (E-UTRA); Requirements for support of radio resource management (Release 10) ", Dec. 2010, 400 pages.

3rd Generation Partnership Project (3GPP), TS 36.321, V10.0.0, "3rd Generation Partnership Project; Technical Specification Group Radio Access Network; Evolved Universal Terrestrial Radio Access (E-UTRA); Medium Access Control (MAC) protocol specification (Release 10) ", Dec. 2010, 53 pages.

\* cited by examiner

COLLABORATIVE SENSING USING COORDINATED SILENCING OF USER EQUIPMENT IN LICENSE-EXEMPT BANDS

CROSS-REFERENCE TO RELATED APPLICATIONS

This application is a National Stage Entry of and claims the benefit of PCT Application No. PCT/US12/36133, claims the benefit of U.S. Provisional Patent Application No. 61/481,957, filed on May 3, 2011, and claims the benefit of U.S. Provisional Patent Application No. 61/601,264, filed on Feb. 21, 2012, the contents of which are hereby incorporated by reference herein.

BACKGROUND

The current market of wireless devices, e.g., devices supporting multiple radio technologies, is growing quickly. Wireless devices may use licensed and/or unlicensed spectrums (e.g., bands) for transmitting and receiving communications. Unlicensed bands may include bands such as the TV whitespace (TVWS) band, the industrial, scientific and medical (ISM) band, and the like. Currently many problems exist in the use of communication bands by wireless devices. For example, interference from users of an unlicensed band may create problems for others that may also want to use the unlicensed band.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Systems, methods, and instrumentalities are disclosed to schedule user equipment (UE) measurements. Devices such as UEs and/or home eNodeBs (HeNB) may be using or desire to use a certain spectrum, e.g., a license exempt band, for communications. An EUTRAN device, such as an HeNB, may coordinate UE actions in order measure the license exempt band (e.g., to detect interference from other users). For example, the HeNB may identify a first cluster of UEs and a second cluster of UEs. Each cluster may comprise one or more UEs. The HeNB may determine a measuring gap schedule relating to the first cluster of UEs and the second cluster of UEs. The measuring gap schedule may indicate a measurement time (e.g., a gap) for each cluster. The measurement time may be referred to as a respective measurement time that may relate to particular device or cluster of devices. A respective measurement time may indicate that UEs in a cluster withhold a transmitting and/or receiving during the respective measurement time (e.g., the UEs in the cluster may be quiet during the respective measurement time). The UEs in the cluster may measure (e.g., sense) a spectrum (e.g., frequency, channel, etc.) associated with a supplementary cell during the respective measurement time (e.g., perform measurements of the license exempt band during the respective measurement time). The UEs in the cluster may sense the spectrum to detect primary users and/or secondary users that may be using the spectrum.

The HeNB may send the measuring gap schedule to the first cluster of UEs and the second cluster of UEs. For example, the HeNB may send the measuring gap schedule associated with the first cluster of UEs to the first cluster of UEs and the measuring gap schedule associated with the second cluster of UEs to the second cluster of UEs. The HeNB may send the measuring gap schedule to the clusters via one or more RRC messages and/or MAC CE messages. The measuring gap schedule may comprise one or more of the following: an identification for a cluster; an identification for each UE in a cluster; the start time to take measurements; the length of the respective measurement time (e.g., the gap); and periodicity of the gap schedule; etc. The HeNB may receive spectrum measurements of the supplementary cell (e.g., of the license exempt band) from the first cluster of UEs and the second cluster of UEs in accordance with the measuring gap schedule. Embodiments contemplate that other network devices may perform the role of the HeNB as disclosed herein, e.g., a Node B, an eNode B, a base station, etc.

The measuring gap schedule may indicate that the clusters follow a coordinated silencing pattern. For example, the measuring gap schedule may indicate a sequentially quiet measuring pattern, a sequentially active measuring pattern, etc. A sequentially quiet measuring pattern may indicate that one cluster be quiet and take measurements (e.g., withhold transmissions during its respective measurement time and measure the spectrum associated with the supplementary cell) when other clusters are active. A sequentially active measuring pattern may indicate that one cluster remains active when other clusters are quiet, e.g., the other clusters may withhold transmissions during their respective measurement times and measure the spectrum associated with the supplementary cell.

BRIEF DESCRIPTION OF THE DRAWINGS

A more detailed understanding may be had from the following description, given by way of example in conjunction with the accompanying drawings wherein.

DETAILED DESCRIPTION

Figure 1:
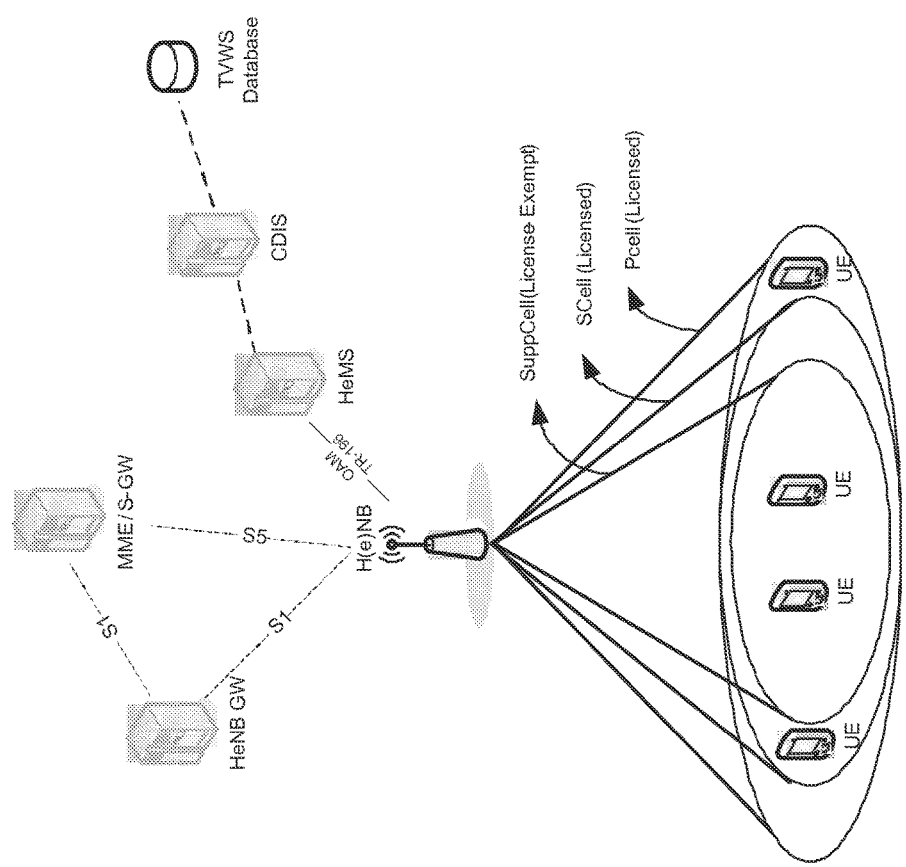
FIG. 1 illustrates an exemplary communication system.

A detailed description of illustrative embodiments may now be described with reference to the figures. However, while the present invention may be described in connection with exemplary embodiments, it is not limited thereto and it is to be understood that other embodiments may be used or modifications and additions may be made to the described embodiments for performing the same function of the present invention without deviating therefrom. Embodiments may be described herein with reference to an HeNB. However, the role of the HeNB may be performed by other network devices, such as a Node B, eNode B, home eNode B, base station, etc. Reference may be made herein to a respective measurement time. A respective measurement time may relate to a measurement time associated with a device or cluster of devices. The term measurement time may relate to a respective measurement time, e.g., when applied to a device or cluster of devices.

Communication in license-exempt bands, such as TV whitespace (TVWS) and industrial, scientific and medical (ISM) bands, may assume that the spectrum used is shared with primary incumbents of the spectrum or with other secondary users where channel usage may or may not be coordinated. A wireless system operating in whitespaces may need to monitor the spectrum being used for primary and secondary users, and make a decision on evacuation of the spectrum or continued use of the spectrum.

The occupancy of a spectrum may be evaluated. A centralized database may be used, e.g., as indicated by the FCC for operating in TVWS. The database may be accessed periodically to determine the spectrum occupancy pattern. Examples of such a database may include a list of spectra that may or may not be used due to primary user occupancy patterns, a coexistence database where wireless systems collaborate and register their spectrum occupancy in the database so that spectrum use may be coordinated, etc. Sensing algorithms may be used (e.g., independently or as an aid to a database) to study spectrum occupancy patterns, identifying other wireless systems occupying the spectrum using specific signatures in their waveform, etc. This may be achieved by introducing the concept of spectrum sensing where spectrum spanned by the radio frequency (RF) environment of the wireless system nay be monitored, e.g., on a continuous or regular basis.

Spectrum actively being used by the wireless system (e.g., active channel/spectrum) may support the concept of silent (e.g., quiet) periods (e.g., gaps) where the wireless system (e.g., one or more HeNBs) may remain silent synchronously and/or periodically to be able to monitor (e.g., sense, measure, etc.) primary users and/o secondary users trying to occupy the same spectrum. The sensing algorithm may obtain I/Q samples from the radio front end during the silent period and processes them to look for other users (e.g., primary and/or secondary) and generate an occupancy result, and in the case of secondary user interference, may generate a percentage utilization metric for the channel, e.g., for interference management and quality assessment. Unlicensed band use may create interference and measurement problems that may be different from the context of cell selection, mobility management, and inter-RAT cell handover.

Cellular radio link quality measurements, such as RSRP, RSRQ, etc., may be performed in a user equipment (UE) during a measurement gap and reported back to the network, e.g., using RRC signaling. This signaling framework may be used to perform spectrum sensing during the gaps for active channel sensing, and wideband sensing in general (e.g., for alternate and/or backup channels) during other times, and report back to the network. Disclosed herein may be embodiments associated with scheduling measuring gaps, e.g., in the context of an LTE system, as well as signaling for scheduling measuring gaps.

FIG. 1 illustrates an exemplary communication system, which may include a Home(e) Node B (HeNB) with multiple UEs within the cell. Referring to FIG. 1, some UEs may be in RRC idle mode while others may be in RRC connected mode. The HeNB may have a wired backhaul connection to the HeNB GW, MME, and HeMS. The HeNB may communicate with a TV whitespace database through the HeMS. The Home(e) Node B may be capable of operating over licensed bands (e.g., primary and/or secondary cells) and over license-exempt bands (e.g., as supplementary cells). That is, a Home(e) Node B and UE may be able to communicate with each other over one or more bands, e.g., licensed bands, a licensed band and a license-exempt band, unlicensed bands, etc.

To use the TVWS bands for carrier aggregation with a licensed band, the Home(e) Node B may periodically query the TV white space database for vacant channels. It may then sense each of the vacant channels to determine if the channels are used by other secondary users or if they are vacant. If the channel is sensed as empty (e.g., users are not detected), it may then set up one or more supplementary cells on those TVWS frequencies.

In idle mode, a UE may be camped on a primary cell (e.g., on a licensed band) and may not yet be assigned any physical channel resources tier communication. In this mode, the UE may potentially sense the license-exempt spectrum to assess the presence of primary users or interference due to secondary users. The occupancy and/or availability of the LE band may be logged at the UE, which may include associated sensing metrics if any, and reported to the Home(e) Node B periodically and/or aperiodically, e.g., over the licensed uplink channel(s) in connected mode.

Figure 2:
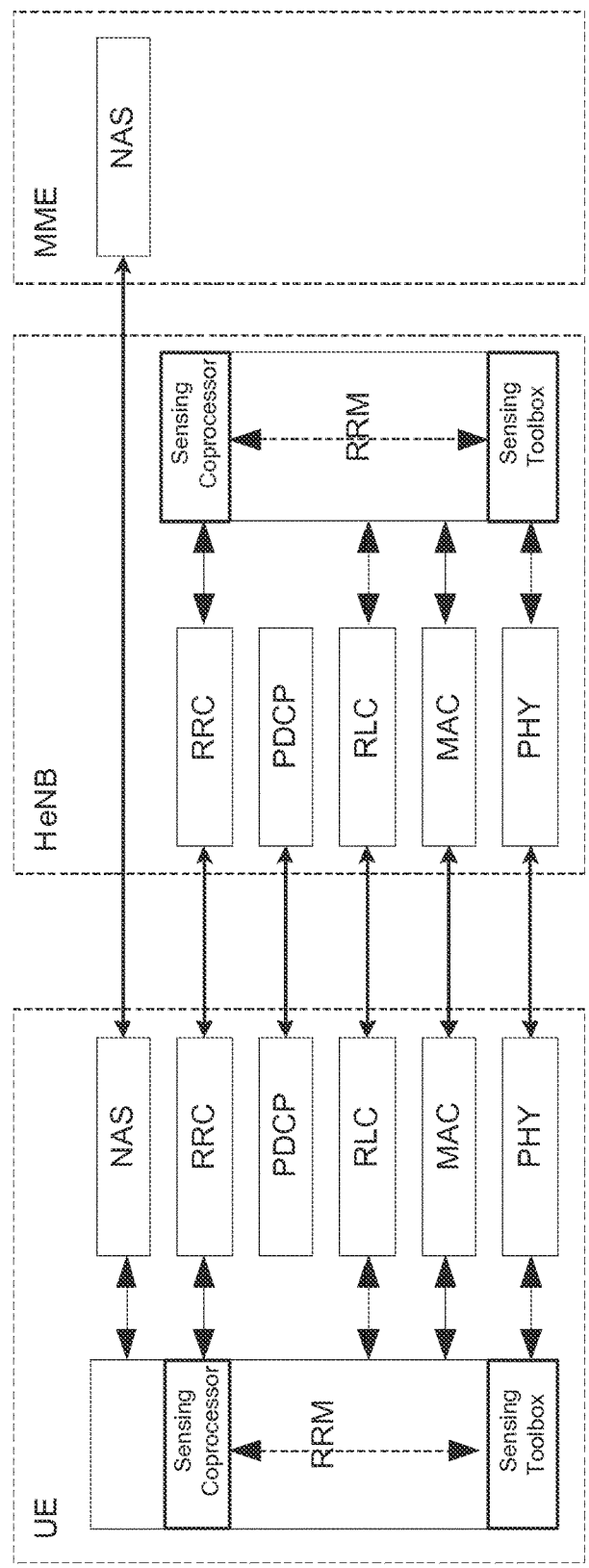
FIG. 2 illustrates an exemplary protocol stack.

FIG. 2 illustrates an exemplary protocol stack at the UE, HeNB, and MME and a logical communication link between corresponding modules in the protocol stacks at the nodes. FIG. 2 may depict the RRM module at the HeNB and UE, and show interactions with various layers of the stack. The RRM module may support spectrum sensing in addition to resource management functionalities, e.g., load balancing, packet scheduling, radio bearer control, radio admission control, dynamic spectrum allocation, inter-cell interference coordination, etc. Spectrum sensing functionality within the RRM may be split into 2 modules. The sensing toolbox may be an advanced signal processing module that implements various detection and estimation algorithms to investigate spectral and/or waveform characteristics, e.g., to determine occupancy patterns within the spectrum by primary and/or secondary users, interference in the spectrum, etc. The sensing co-processor may be an entity that schedules sensing operations on specific spectral bands at specific times for specific durations. The sensing co-processor may interact with the RRC module to signal sensing start times and gap schedules from HeNB to UE and may carry sensing results from the UE back to the HeNB.

Rules have been established to make unused spectrum in TV bands available for unlicensed broadband wireless devices. Since unused TV channels may vary from location to location, the devices may need flexibility and agility to locate and operate on the unused channels, e.g., since device location may vary. The devices which may operate in TV white spaces, e.g., following rules specified by the FCC, may be referred to as TV band devices (TVBD). Types of TVBD devices may include: fixed, mode II, and mode I. Fixed devices may not be mobile. Fixed devices may have geo-location capability and have access to the database. Mode II devices may be mobile, have geo-location capability, and/or have access to the database. Mode I devices may be mobile, may not have geo-location capability, and may not have access to the database. Some devices may be limited to sensing and may have the capability to sense the environment, e.g., in a TV band, for one or more of: primary users, secondary users, interference, etc. Such devices may not have geo-location capability and may not have access to the database.

In the system architecture, the HeNB may be a fixed TVBD and the UE may be a mode I device, a mode II device, a TV band device limited to sensing, etc. The HeNB may have multiple antennas and may be capable of beam forming. The HeNB and/or UEs may have spectrum sensing capability.

Supplementary cells operating in license-exempt bands may be limited to operating in downlink mode, uplink mode, or dynamic uplink and/or downlink mode. That is, in an embodiment, the HeNB and UEs may limit the use the of the LE spectrum for DL transmission. It may be assumed that the LE bands are limited to downlink operation.

In cellular systems operating in licensed bands, spectrum may be dedicated to cellular operation and use of the spectrum by other devices and/or systems outside of the cellular operator's network may not be permitted. That is, the cellular operator may be the primary incumbent of the spectrum. When operating a cellular system in a license-exempt band, cellular devices may not have exclusive access to the license-exempt spectrum. Other devices and/or systems may also operate in the spectrum, e.g., in an unlicensed and/or uncoordinated fashion. In some cases, there may be primary incumbents of the spectrum (e.g., licensed by the FCC) who may not use their spectrum continuously and may be able to afford to let other systems like cellular systems operate in the spectrum on a temporary basis. When the cellular system operates in a license-exempt band, measurement gaps may be scheduled on the LE bands, e.g., carved out of an active communication time between HeNB and UE, e.g., so that the UE and/or HeNB (e.g., the sensing toolbox at the HeNB) may sense the spectrum periodically and/or aperiodically and assess the presence of primary and/or secondary users in the spectrum.

Systems, methods, and instrumentalities are disclosed to schedule user equipment (UE) measurements. Devices such as UEs and/or home eNodeBs (HeNB) may be using or desire to use a certain spectrum, e.g., a license exempt band, for communications. An EUTRAN device, such as an HeNB, may coordinate UE actions in order measure the license exempt band (e.g., to detect interference from other users). For example, the HeNB may identify a first cluster of UEs and a second cluster of UEs. Each cluster may comprise one or more UEs. The HeNB may determine a measuring gap schedule relating to the first cluster of UEs and the second cluster of UEs. The measuring gap schedule may indicate a measurement time (e.g., a gap) for each cluster. The measurement time may be referred to as a respective measurement time that may relate to particular device or cluster of devices. A respective measurement time may indicate that UEs in a cluster withhold a transmitting and/or receiving during the respective measurement time (e.g., the UEs in the cluster may be quiet during the respective measurement time). The UEs in the cluster may measure (e.g., sense) a spectrum (e.g., frequency, channel, etc.) associated with a supplementary cell during the respective measurement time (e.g., perform measurements of the license exempt band during the respective measurement time). The UEs in the cluster may sense the spectrum to detect primary users and/or secondary users that may be using the spectrum.

The HeNB may send the measuring gap schedule to the first cluster of UEs and the second cluster of UEs. For example, the HeNB may send the measuring gap schedule associated with the first cluster of UEs to the first cluster of UEs and the measuring gap schedule associated with the second cluster of UEs to the second cluster of UEs. The HeNB may send the measuring gap schedule to the clusters via one or more RRC messages and/or MAC CE messages. The measuring gap schedule may comprise one or more of the following: an identification for a cluster; an identification for each UE in a cluster; the start time to take measurements; the length of the respective measurement time (e.g., the gap); and periodicity of the gap schedule; etc. The HeNB may receive spectrum measurements of the supplementary cell (e.g., of the license exempt band) from the first cluster of UEs and the second cluster of UEs in accordance with the measuring gap schedule. Embodiments contemplate that other network devices may perform the role of the HeNB as disclosed herein, e.g., a Node B, an eNode B, a base station, etc.

The measuring gap schedule may indicate that the clusters follow a coordinated silencing pattern. For example, the measuring gap schedule may indicate a sequentially quiet measuring pattern, a sequentially active measuring pattern, etc. A sequentially quiet measuring pattern may indicate that one cluster be quiet and take measurements (e.g., withhold transmissions during its respective measurement time and measure the spectrum associated with the supplementary cell) when other clusters are active. A sequentially active measuring pattern may indicate that one cluster remains active when other clusters are quiet, e.g., the other clusters may withhold transmissions during their respective measurement times and measure the spectrum associated with the supplementary cell.

Systems, methods, and instrumentalities for scheduling silent period (e.g., measuring) gaps, e.g., in an LTE cellular system, may be provided. For example, the periodic and/or aperiodic silent gaps may be configured for the UEs in a system simultaneously or may be configured for one or more clusters of UEs at a time. The scheduling may include a broadcast-GAP approach, a multicast-GAP approach, and a hybrid-GAP approach. UEs may withhold transmissions and take measurements (e.g., sense) of the spectrum (e.g., SuppCell) during a quiet period (e.g., a gap). An HeNB may take measurements during a gap.

A broadcast-GAP (B-GAP) approach may be disclosed. To schedule a measurement gap for sensing, an HeNB, e.g., operating in a single spectrum band, may silence the UEs in its cell to enable the UEs and/or the HeNB (e.g., sensing toolbox) to make sensing measurements on the spectrum and report back to the HeNB. The HeNB may need to incorporate a scheduler module or enhance existing scheduling algorithms for broadcast GAP scheduling and handling.

Figure 3:
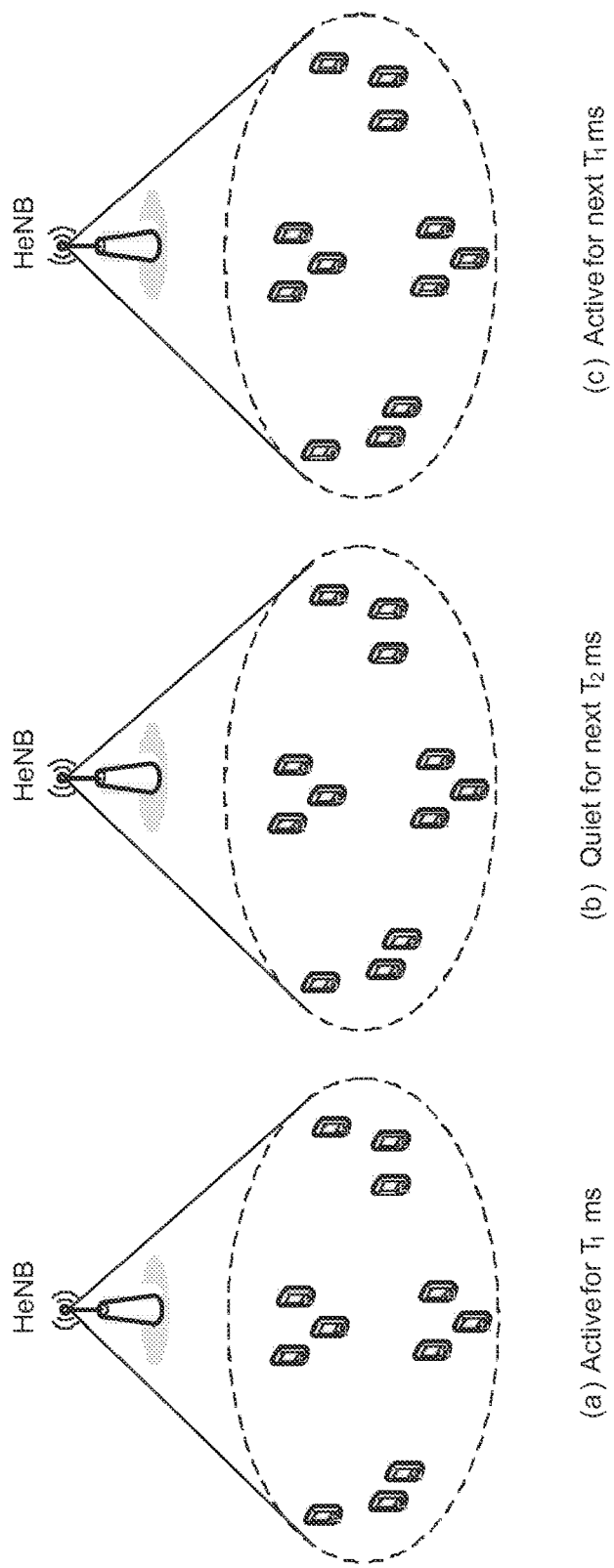
FIG. 3 illustrates an exemplary broadcast-GAP approach.
Figure 4:
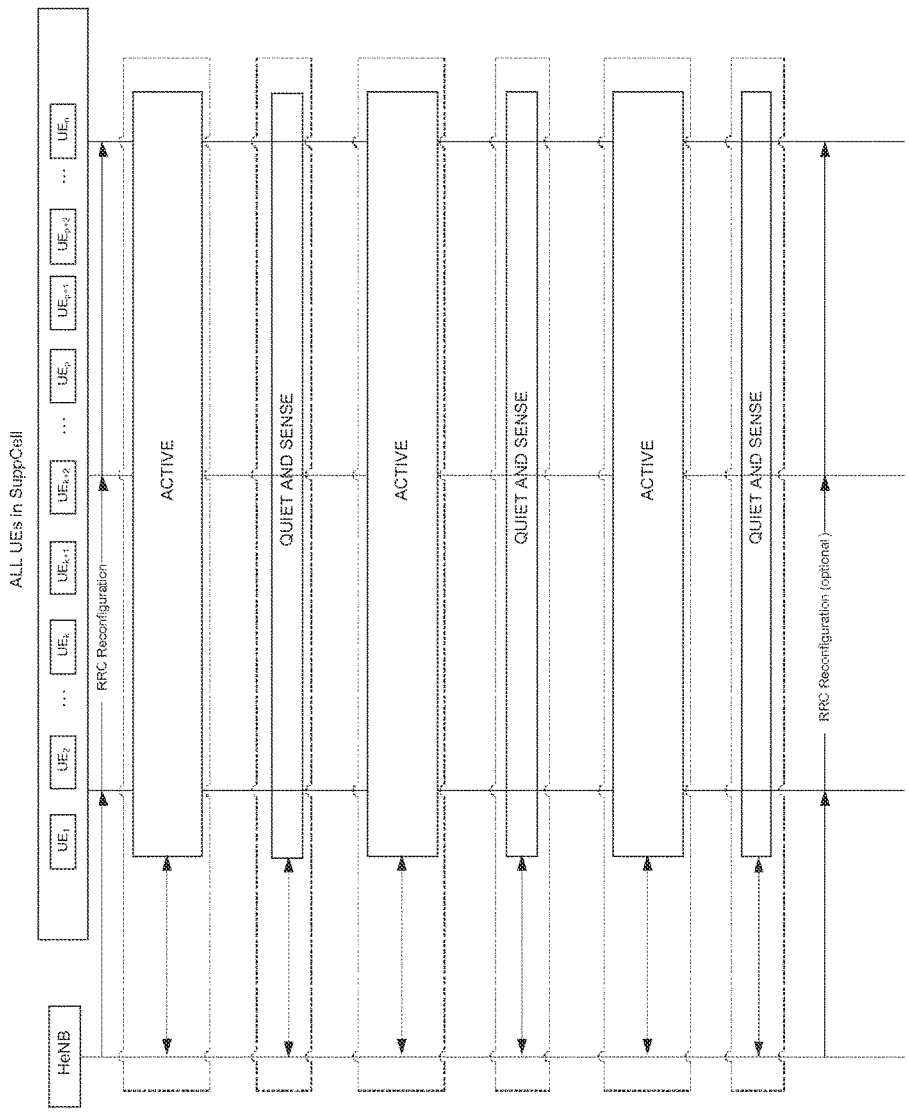
FIG. 4 illustrates exemplary signaling by the HeNB of a measuring gap schedule.

FIG. 3 illustrates an exemplary broadcast-GAP approach with the UEs associated with the HeNB being quiet periodically, e.g., in SuppCell. Referring to FIG. 3, each UE associated with the HeNB may be active for a time and quiet (e.g., silent) during another time. FIG. 4 illustrates signaling relating to the UEs associated with the HeNB. FIG. 4 illustrates exemplary signaling (e.g., which may include one or more RRC messages) by the HeNB of a measuring gap schedule (e.g., broadcast-GAP) that may include the timing of active periods and quiet periods. The UEs may withhold transmissions and take measurements (e.g., sense) of the spectrum (e.g., SuppCell) during the quiet periods.

A multicast gap (M-GAP) approach may be disclosed. Measurement gaps may be scheduled in the "spatial domain." UEs in a cell may be identified as being part of clusters, e.g., as shown in the figures described below. Examples of clusters of UEs may be UEs that are in a cell sector, UEs located in a geographic region (e.g., UEs in an area near a serving eNB and served using sectoral antennas and/or beamforming by the eNB, etc.). The HeNB may have multiple antenna capability and may use transmit beamforming to serve each UE cluster independently in the downlink over the SuppCell. The time schedule of serving each cluster with periodically scheduled gaps for sensing and measuring may be specific to each HeNB. M-GAP may provide one or more of the following: (1) distributed sensing, e.g., sharing the load of sensing across UEs; (2) a geographical distribution of interference pattern; and (3) power savings, e.g., silence different clusters of UEs periodically and/or aperiodically to perform sensing operations while scheduling a DRX for the rest of the receive path. Exemplary multicast gap approaches may include: (1) sequentially quiet clusters, where each cluster may be silenced sequentially while the other clusters actively use the spectrum; and (2) sequentially active clusters, where each cluster is scheduled to be active in the spectrum sequentially while the other clusters are silenced, e.g., for measuring.

Sequentially active clustering may be disclosed. One cluster of UEs may be active, e.g., in a spectrum, while other clusters of UEs may be kept quiet (e.g., by the HeNB). The active cluster may access the spectrum to communicate with the HeNB for a specified duration (e.g., a scheduled active period) after which it may relinquish access to the spectrum and remain quiet. Each UE cluster associated with the HeNB may be given access to the spectrum individually, while the other clusters are silenced. After a specified active period, the active cluster of UEs may relinquish the spectrum access to another UE cluster.

Figure 5:
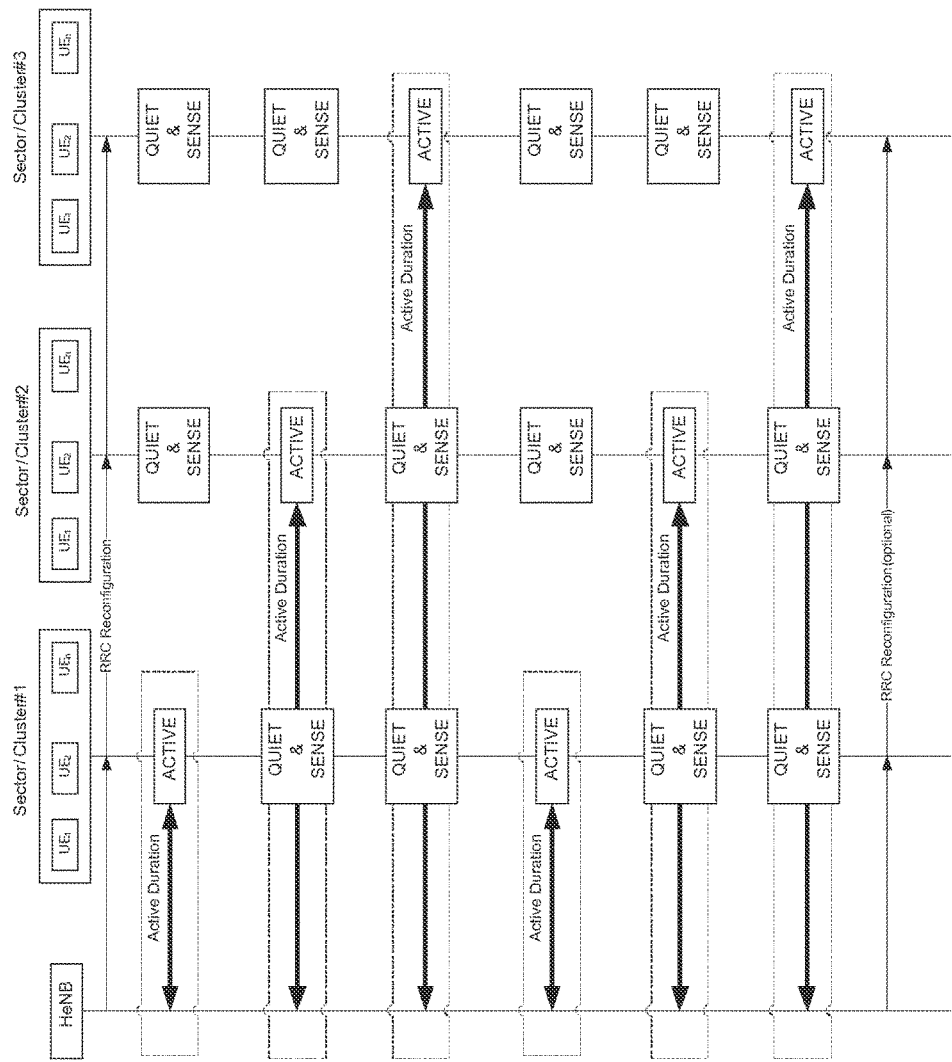
FIG. 5 illustrates an exemplary call flow for sequentially active clusters according to embodiments of the present disclosure.
Figure 6:
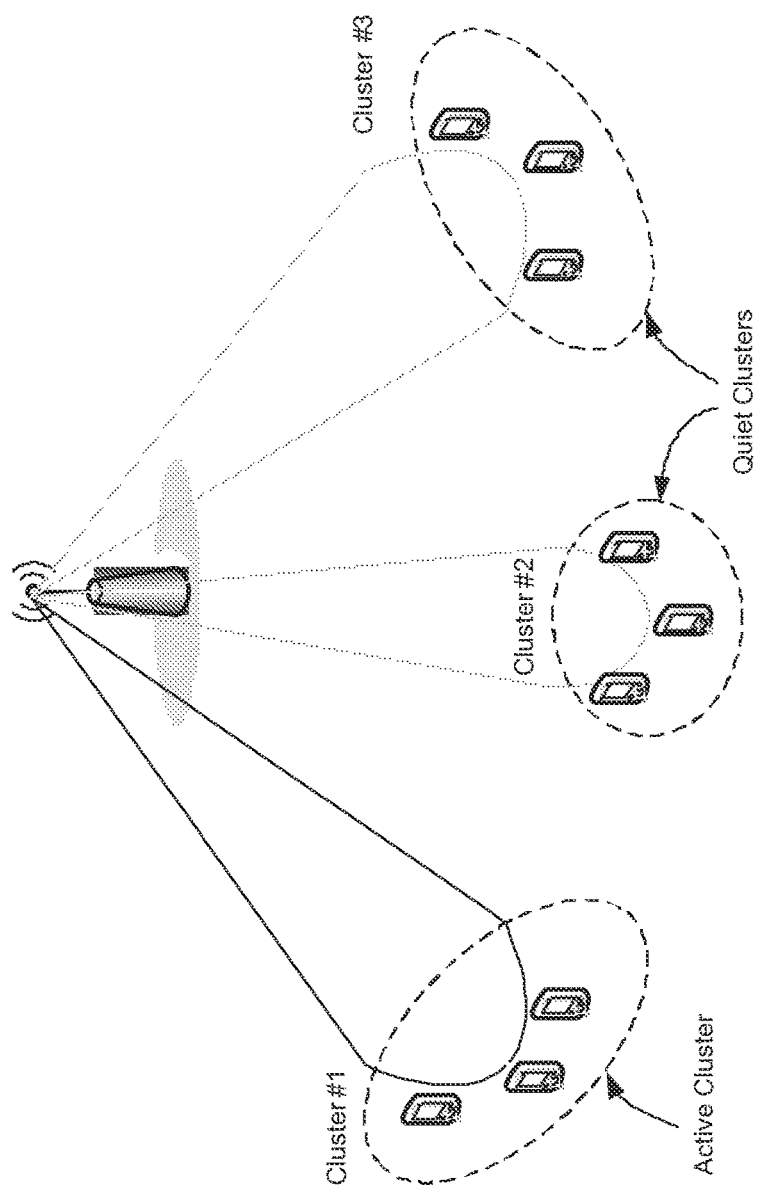
FIG. 6-8 illustrate clusters of UEs configured in an exemplary sequentially active multicast-GAP approach.
Figure 7:
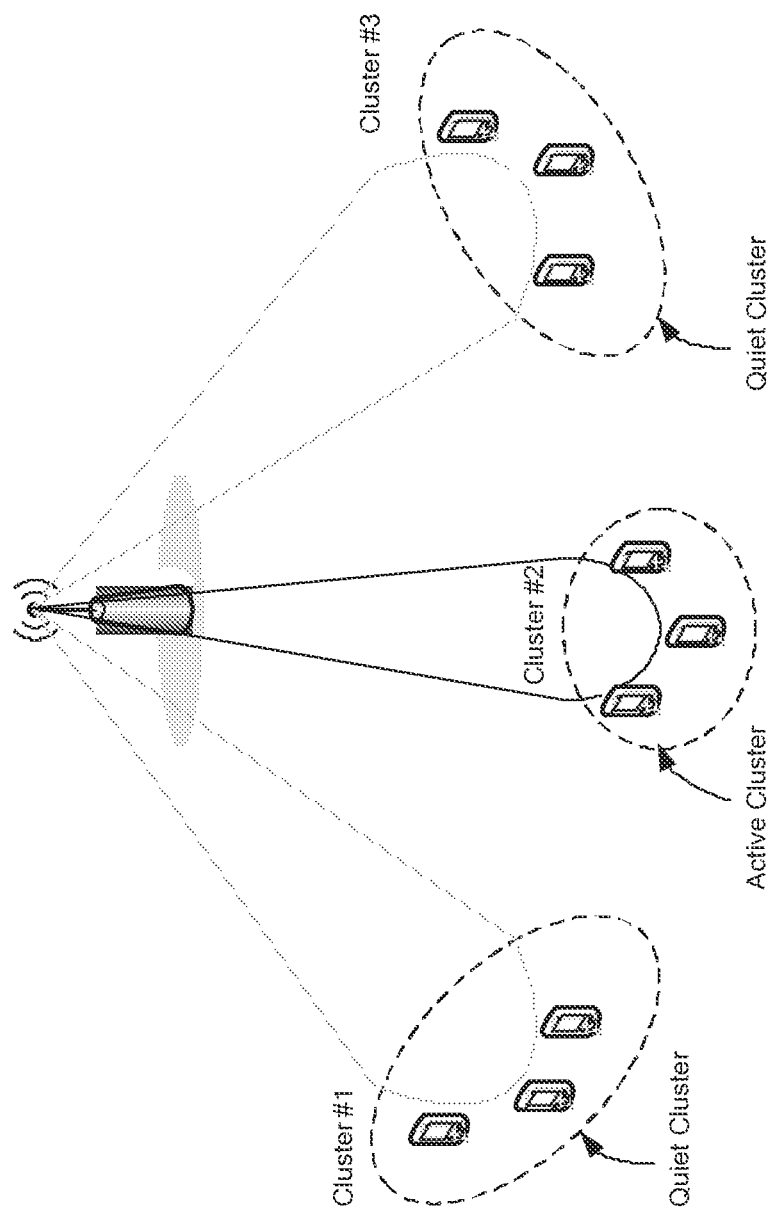
Figure 8:
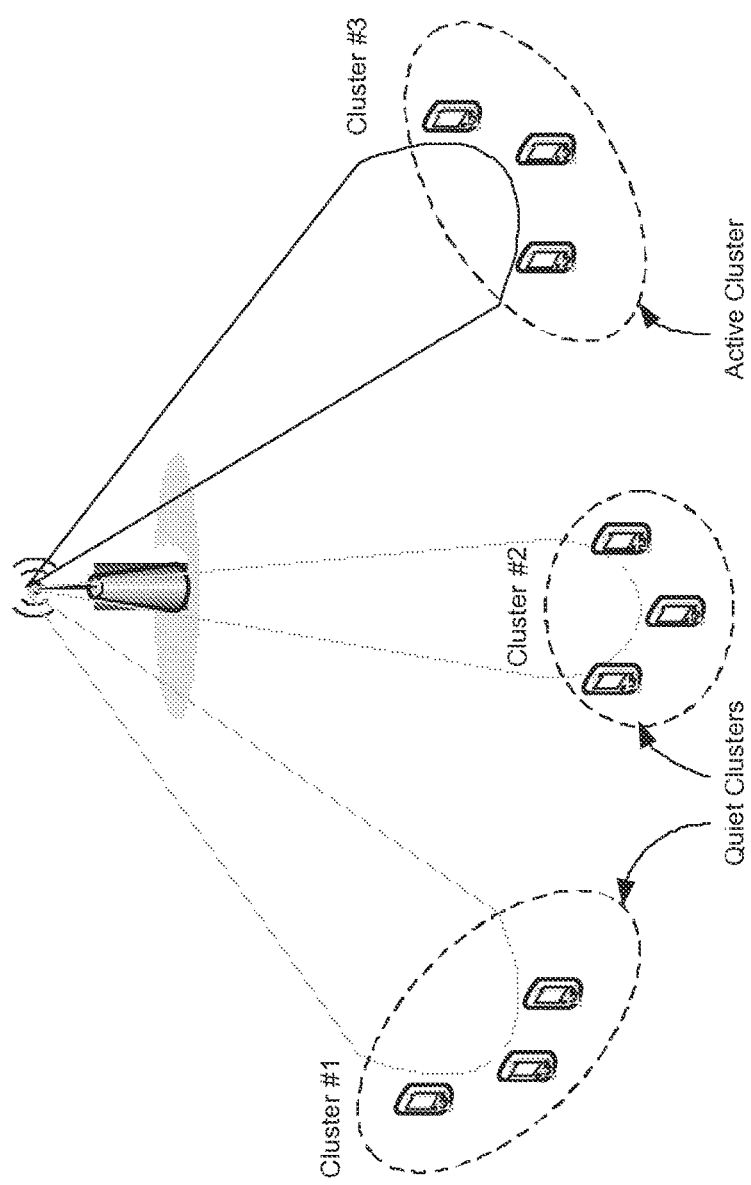

FIG. 5 illustrates an exemplary call flow for sequentially active clusters. FIG. 5 illustrates signaling (e.g., by the HeNB) for sequentially active clusters, which may include one or more RRC messages to schedule the timing of active periods and quiet periods. One cluster of UEs may be active, while the other clusters of UEs may be quiet. The quiet UEs may take measurements (e.g., of a supplementary cell) during the scheduled quiet period (e.g., the scheduled measuring gap). FIGS. 6-8 illustrate three clusters of UEs (e.g., cluster #1, cluster #2, and cluster #3) configured in an exemplary sequentially active multicast-GAP approach. FIG. 6 illustrates a time when cluster #1 is scheduled to be active (e.g., for communicating with the HeNB), while cluster #2 and cluster #3 are scheduled to be quiet (e.g., for measuring). FIG. 7 illustrates a time when cluster #2 is scheduled to be active, while cluster #1 and cluster #3 are scheduled to be quiet (e.g., for measuring). FIG. 8 illustrates a time when cluster #3 is scheduled to be active, while cluster #1 and cluster #2 are scheduled to be quiet (e.g., for measuring). In the example of FIGS. 6-8, the HeNB may identify the clusters and determine the measuring gap schedule, which may include one or more of quiet and sense periods and active periods. The HeNB may send the measuring gap schedule to the clusters and the clusters may enter active and quiet states according to the schedule. When scheduled in a measuring gap (e.g., quiet period), a cluster may perform spectrum measurements (e.g., of a supplementary cell) and send the spectrum measurements to the HeNB.

Sequentially quiet clustering may be disclosed. For example, one cluster of UEs may be selected (e.g., by a HeNB) to be quiet for a specified duration (e.g., measuring gap) while the other clusters of UEs may be active in the spectrum (e.g., supplementary cell) and communicating with the HeNB. The quiet cluster may sense the spectrum during the specified duration. After the measuring gap, the quiet cluster may be made an active cluster and may send its sensing (e.g., measured) results back to the HeNB during an active phase. Each UE cluster may be selected sequentially to sense the spectrum for a specified duration while the other UE clusters may be active, e.g., communicating with, or identified as being able to communicate with, the HeNB.

Figure 9:
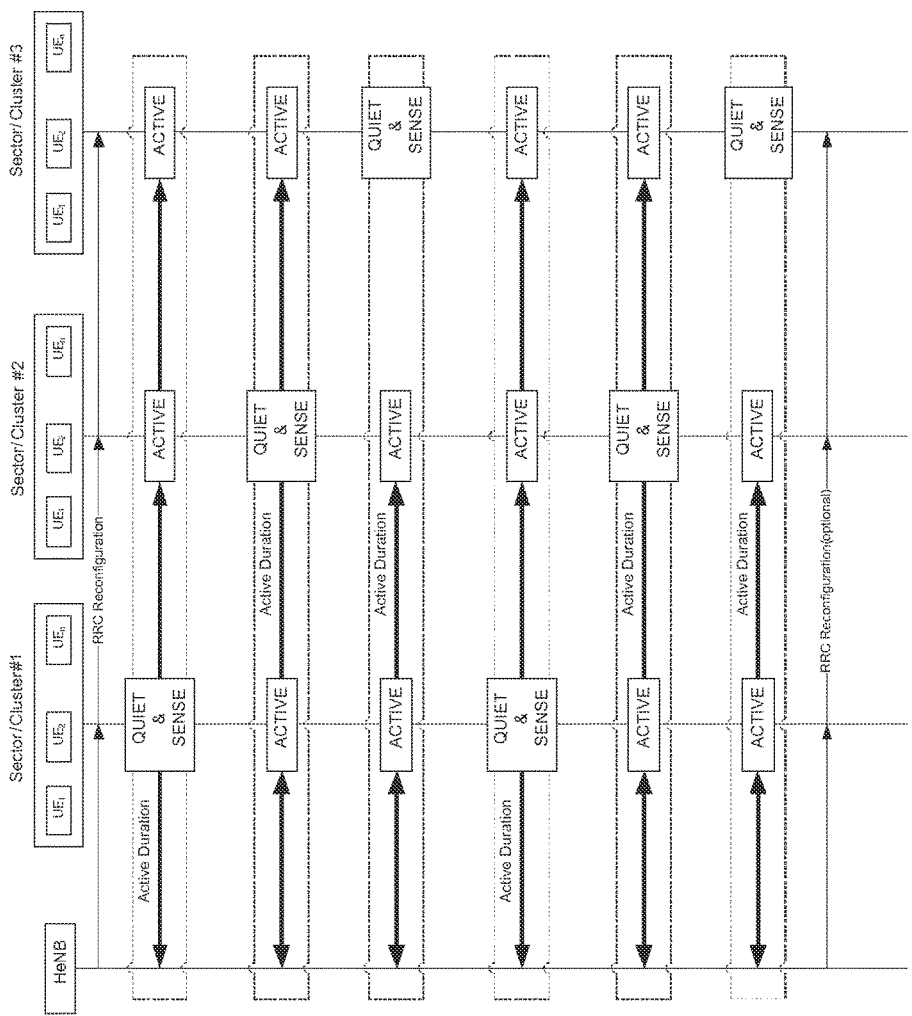
FIG. 9 illustrates an exemplary call flow for sequentially quiet clusters.

FIG. 9 illustrates an exemplary call flow for sequentially quiet clusters. FIG. 9 illustrates signaling (e.g., by the HeNB) for sequentially quiet clusters, which may include one or more RRC messages to schedule the timing of active periods and quiet periods. One cluster of UEs may be quiet, while the other clusters of UEs may be active. The quiet UEs may take measurements (e.g., of a supplementary cell) during the scheduled quiet period (e.g., the scheduled measuring gap). The active UEs may transmit to the HeNB during an active period.

Figure 10:
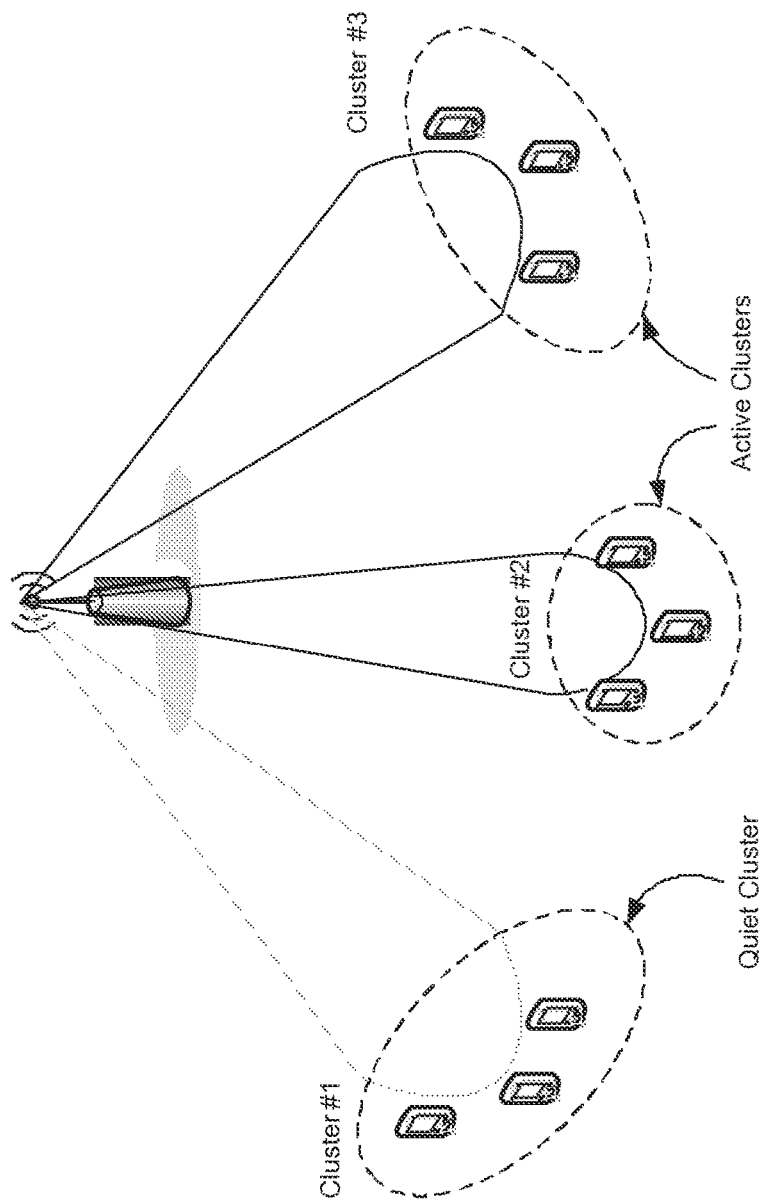
FIGS. 10-12 illustrate three clusters of UEs configured in an exemplary sequentially quiet multicast-GAP approach.
Figure 11:
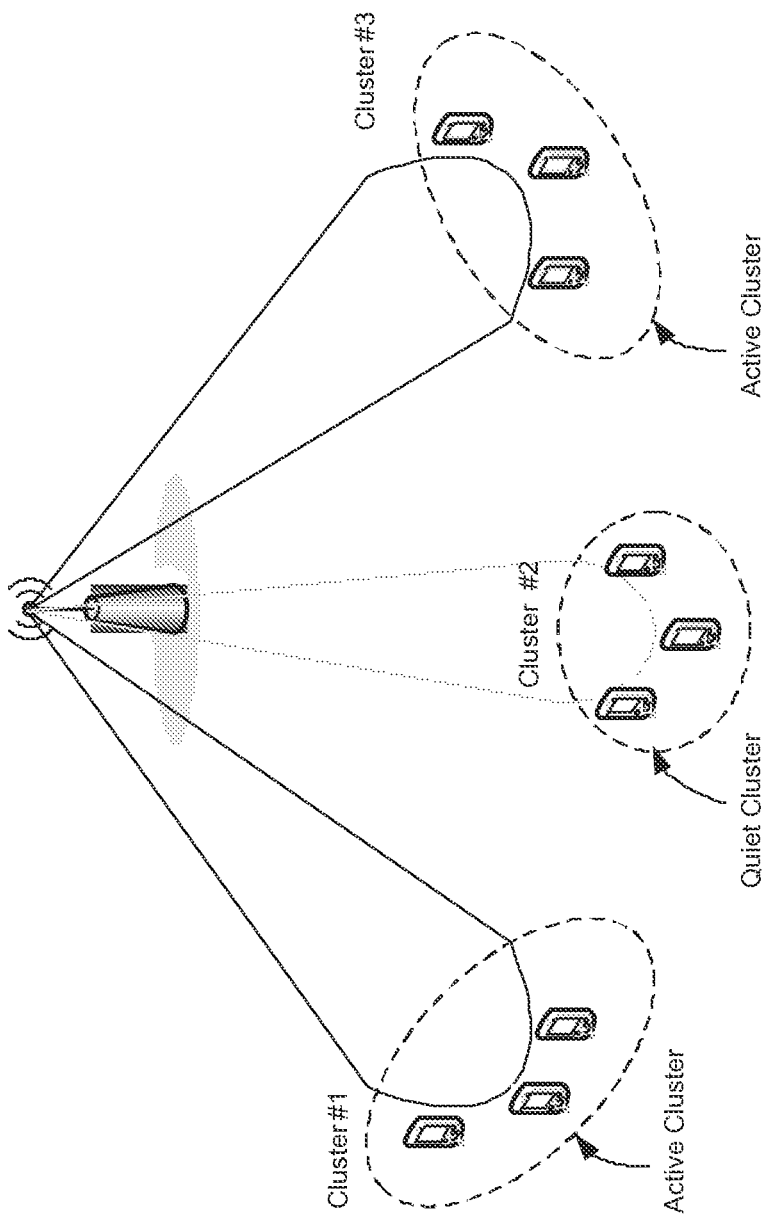
Figure 12:
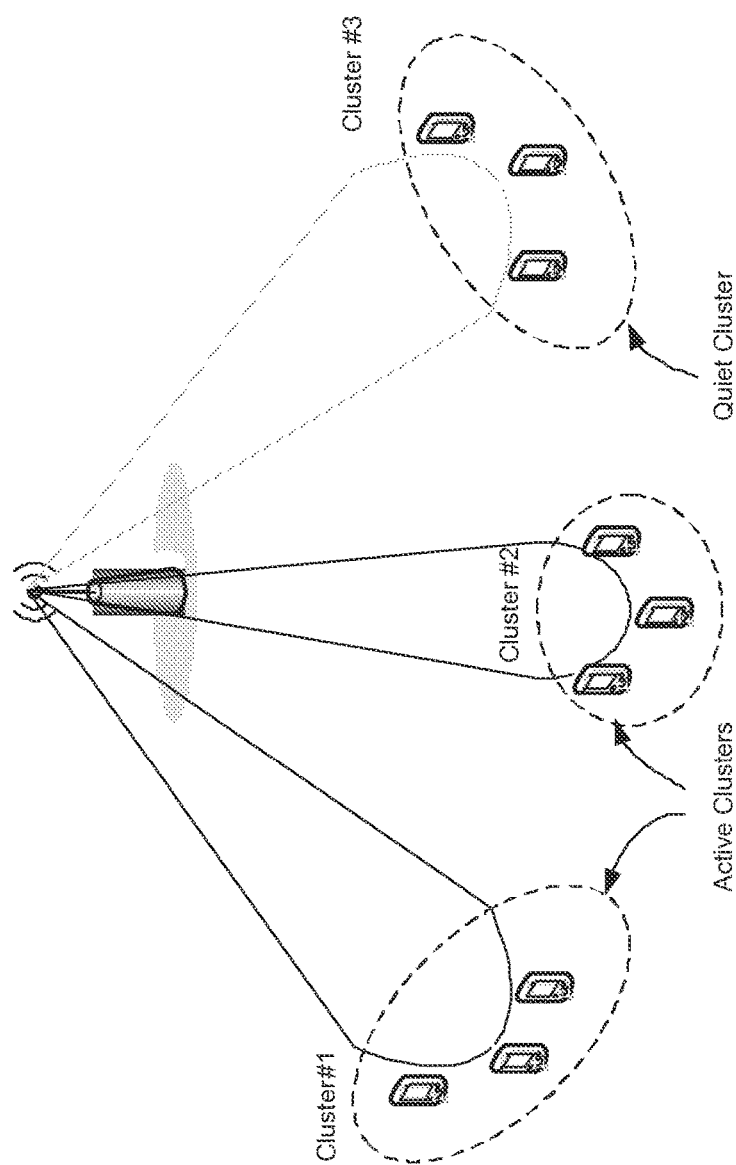

FIGS. 10-12 illustrate three clusters of UEs (e.g., cluster #1, cluster #2 and cluster #3) configured in an exemplary sequentially quiet multicast-GAP approach. FIG. 10 illustrates a time when cluster #1 is scheduled to be quiet (e.g., for measuring), while cluster #2 and cluster #3 are scheduled to be active (e.g., for communicating with the HeNB). FIG. 11 illustrates a time when cluster #2 is scheduled to be quiet, while cluster #1 and cluster #3 are scheduled to be active. FIG. 12 illustrates a time when cluster #3 is scheduled to be quiet, while cluster #1 and cluster #2 are scheduled to be active. In the example of FIGS. 10-12, the HeNB may identify the clusters and determine the measuring gap schedule, which may include one or more of quiet and sense periods and active periods. The HeNB may send the measuring gap schedule to the clusters and the clusters may enter active and quiet states according to the schedule. When scheduled in a measuring gap (e.g., a quiet period), a cluster may perform spectrum measurements (e.g., of a supplementary cell) and send the spectrum measurements to the HeNB.

A hybrid gap (H-GAP) approach may be disclosed. A hybrid gap approach may be a hybrid of the B-GAP and M-GAP approaches. For example, a B-GAP may be used followed by M-GAP. The sequence in which B-GAP and M-GAP may be scheduled may be chosen in any fashion.

For example, a cycle or a portion of cycle may be used when switching approaches. For example, a hybrid gap implementation may comprise using a simultaneously active approach (e.g., one cluster is active) during a first time period, switching to a B-GAP approach (e.g., each UE in the HeNB cell is active or quiet) for a second time period, and the simultaneously active approach (e.g., where another cluster is active) is continued during a third time period.

Figure 13:
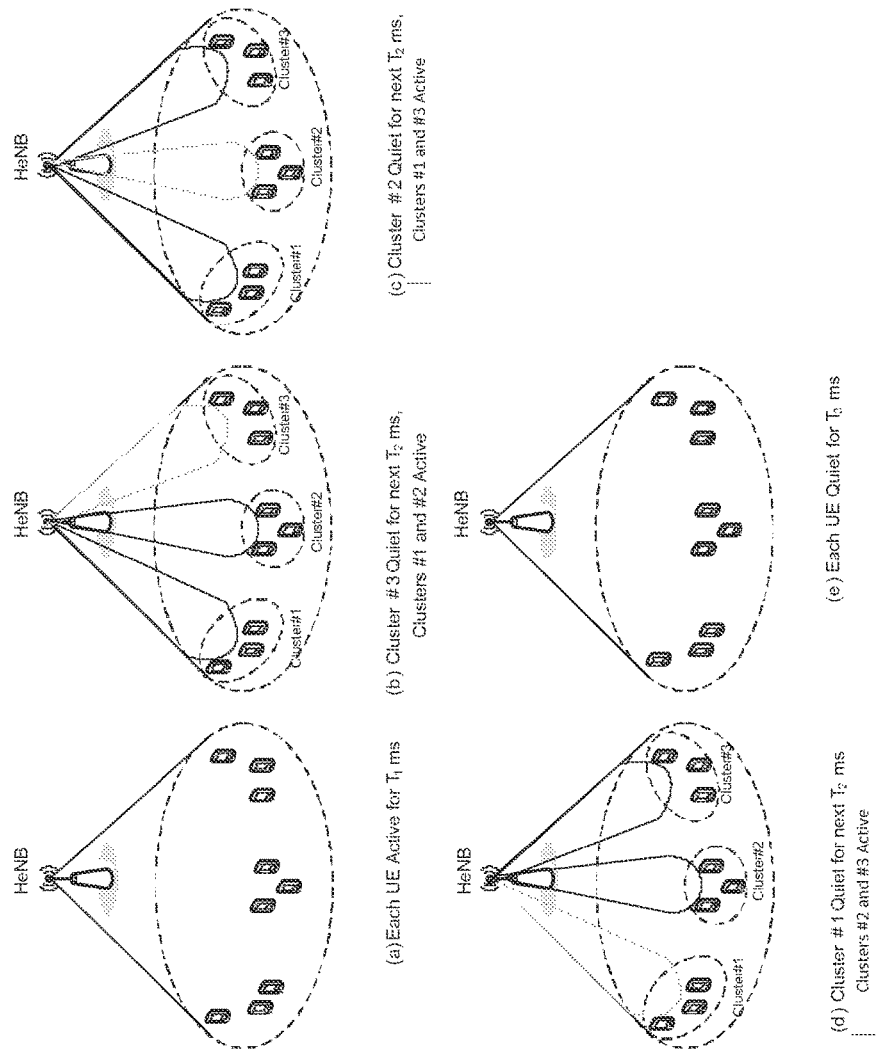
FIG. 13 illustrates an exemplary hybrid gap implementation.

FIG. 13 illustrates an exemplary hybrid gap implementation. FIG. 13(a) illustrates a time during which each of the UEs in the HeNB cell is active (e.g., B-GAP). FIG. 13(b)-FIG. 13(d) illustrate a sequentially quiet sequence (e.g., an M-GAP approach) where the UEs are divided into clusters, and, one of the clusters is kept silent during a given time period. For example, in FIG. 13(b) cluster #3 is quiet during time T2 (e.g., where T2 is a measuring gap scheduled for cluster #3). FIG. 13(e) illustrates a time during which each of the UEs in the HeNB cell is quiet (e.g., B-GAP).

Figure 14:
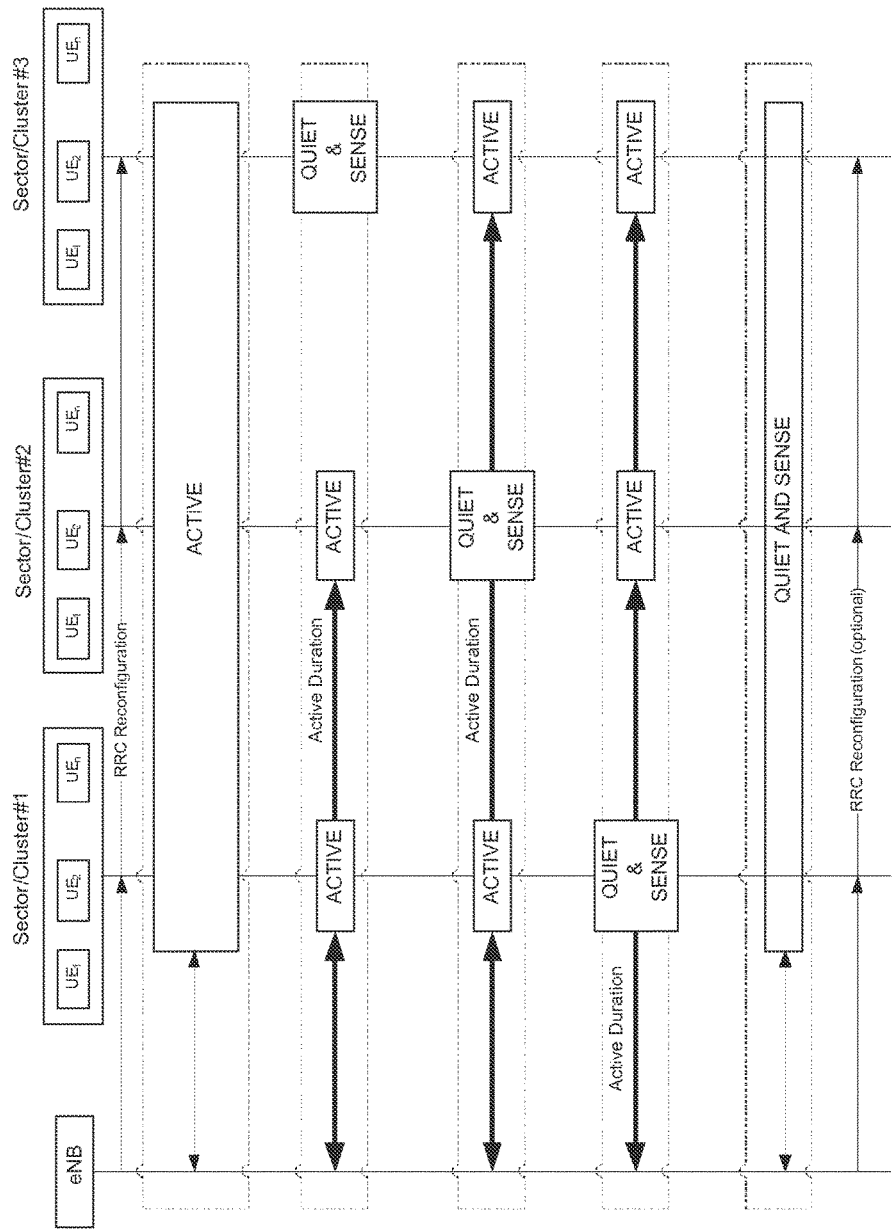
FIG. 14 illustrates an exemplary call flow for hybrid-GAP.

FIG. 14 illustrates an exemplary call flow for hybrid-GAP. FIG. 14 illustrates signaling (e.g., by the HeNB) for a hybrid gap approach, which may include one or more RRC messages to schedule the timing of active periods and quiet periods. FIG. 14 illustrates a B-GAP approach where each of the UEs in a HeNB cell is active. The active B-GAP state is followed by an M-GAP sequentially quiet approach (e.g., one cluster is quiet at a time). The M-GAP sequentially quiet approach is followed by a B-GAP approach where each of the UEs in a HeNB cell is quiet.

UEs may be silenced through an absence of scheduling, e.g., in order for a HeNB to take spectrum measurements. In certain cases, for example when UEs may not support a sensing capability, sensing may be performed at the HeNB and not by the UEs. In such a case, the HeNB may perform sensing at its own times (e.g., periodically, at strategic times dictated by the scheduler's load, etc.). The HeNB may establish a silent period for sensing through the absence of scheduling of uplink grants or downlink allocations to the UEs, e.g., on the supplementary cell. While allocations and grants may be made on other carrier(s), e.g., licensed carriers, the HeNB may not schedule uplink grants or downlink allocations for data transfer on a cell to be measured, e.g., the supplementary cell.

During a silent period scheduled by an absence of grants, the HeNB may perform sensing, e.g., on licensed exempt bands used by the supplementary cells on symbols in a subframe that are not used by the UE for transmission of SRS. The HeNB may use two approaches for scheduling the sensing, e.g., by its own sensing toolbox. The HeNB may perform sensing on each subframe that does not have SRS from UEs, as well as on SRS subframes where the sensing operation is interrupted during the last OFDM symbol of the subframe (e.g., where the SRS resides). This may be beneficial for short sensing bursts that may need to be performed occasionally by the HeNB. The HeNB may temporarily disable (e.g., through RRC signaling) SRS on the supplementary carrier so that sensing may be performed without interruption by the HeNB over longer periods of time. This approach may be used in the case that the sensing toolbox requires a long period of sensing time, e.g., a time that spans over several frames.

Figure 15:
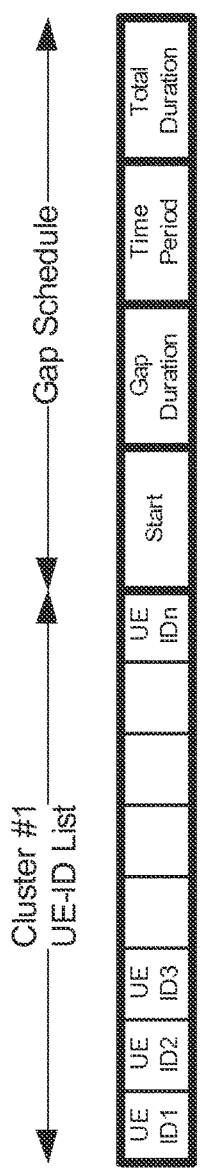
FIG. 15 illustrates an exemplary sequence of fields that may be signaled.
Figure 16:
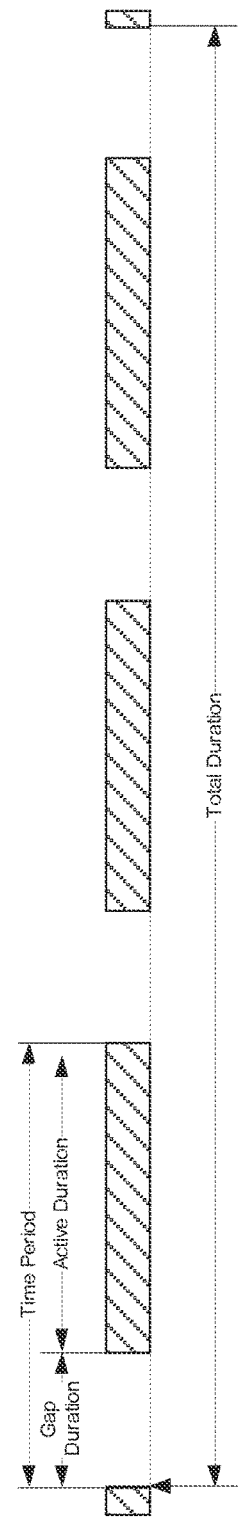
FIG. 16 illustrates exemplary measurement gap parameters.

Signaling may be disclosed for coordinated silencing, e.g., to schedule silencing for the UEs in a cell, clusters of UEs in a cell, etc. For coordinated silencing (e.g., M-GAP), UE-IDs and/or cluster IDs (e.g., where UEs may be pre-mapped to a cluster ID) may be signaled along with the corresponding gap schedules for each UE and/or cluster. A UE-ID may be implemented through the C-RNTI for the UE or a RNTI may be defined relating to measurements. In an example, one cluster may be quiet at a time between consecutive silent period reconfiguration messages. For such a case, FIG. 15 illustrates an exemplary sequence of fields that may be signaled, e.g., in each RRC configuration message. Messages to be signaled may include one or more of the following: UE-IDs of each UE in a cluster and/or or cluster ID, e.g., for UEs identified to be quiet; a start signal to communicate the start of sensing (e.g., a measurement gap during which measurements may be performed); a gap duration for a duty cycle (e.g., may signal gap duration or active duration each period); a time period of the gap schedule (e.g., periodicity of the gap schedule); and a total duration (e.g., a duration from the start of sensing or total gap time, which may be specified in terms of the SFN number). FIG. 16 illustrates an exemplary gap schedule along with measurement gap parameters.

Figure 17:
FIG. 17 illustrates an exemplary RRC configuration message.

Multiple clusters may be scheduled (e.g., by the HeNB) to be quiet between consecutive RRC configuration messages. The clusters may be quiet sequentially or a subset of these clusters could be quiet simultaneously, e.g., based on a start time for each cluster. The fields in the RRC configuration message may comprise multiple sets of cluster UE-IDs and gap schedules for the various clusters, e.g., as shown in FIG. 17. FIG. 17 illustrates an exemplary RRC configuration message with UE IDs and gap schedule for multiple clusters.

System information may be used for signaling. That is, one or more of the above features may be signaled with IEs (e.g., that may be created) or as extensions to existing IEs in the system information carried by RRC signaling. System information may be divided into a MasterInformationBlock (MIB) and one or more SystemInformationBlocks (SIBs).

The MIB may include a limited number of transmitted parameters (e.g., parameters that are frequently used) that may be needed to acquire other information from the cell, and may be transmitted on a BCH. In an example, the MIB may use a fixed schedule with a periodicity of 40 ms with repetitions made within 40 ms. A first transmission of the MIB may be scheduled in sub frame #0 of radio frames for which the SFN mod 4=0, and repetitions may be scheduled in sub frame #0 of other radio frames.

SystemInformationBlockType1 and SI messages may be transmitted on a DL-SCH. In an example, the SystemInformationBlockType1 may use a fixed schedule with a periodicity of 80 ms with repetitions made within 80 ms. A first transmission of SystemInformationBlockType1 may be scheduled in sub frame #5 of radio frames for which the SFN mod 8=0, and repetitions may be scheduled in sub frame #5 of other radio frames for which SFN mod 2=0.

The fields specified above, e.g., UE-IDs, gap schedule configurations, etc., may be split between MIB and SIBs based on a type of the information and/or the frequency with which the information may change. A modification period of the system information may be specified, e.g., so that system information changes may take effect with tolerable latency.

Figure 18:
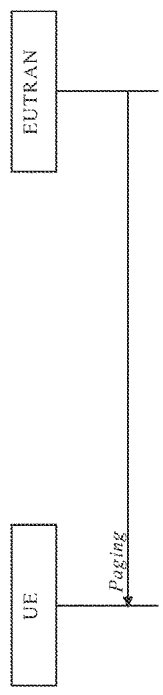
FIG. 18 illustrates exemplar paging between a UE and EUTRAN.
Figure 19:
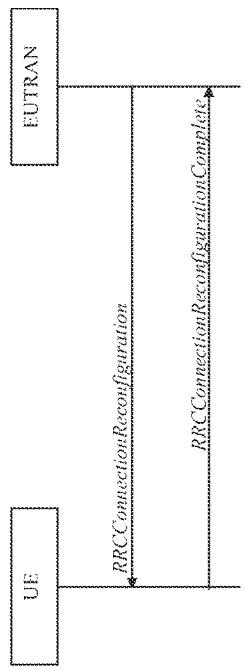
FIG. 19 illustrates an exemplary RRC reconfiguration.

Signaling may be implemented using one or more RRC configuration and/or reconfiguration messages. UEs in RRC_IDLE and UEs in RRC_CONNECTED may be informed, e.g., via signaling, about a system information change. FIG. 18 illustrates exemplary paging between a UE and EUTRAN (e.g., where an HeNB may be an EUTRAN entity that sends the paging message). The paging information may be provided to upper layers, which in response may initiate RRC connection establishment and/or reconfiguration. When a page is received, the UE may wait for an RRC reconfiguration message, e.g., to receive its set of measurement gap parameters. FIG. 19 illustrates an exemplary RRC reconfiguration.

A measuring gap schedule may be configured, e.g., using an IE. To configure measurement gaps, the UE may check a field, e.g., measGapConfig in a MeasConfig IE of an RRC reconfiguration message. A field, such as a field called silentGapConfig, may be defined. If the silentGapConfig field is set to 'setup,' the UE may setup the measurement gap configuration indicated by silentGapConfig.

The IE MeasConfig may specify measurements to be performed by the UE, and may cover intra-frequency, inter-frequency, and inter-RAT mobility as well as configuration of measurement gaps. A field may be defined called silentGapConfig to configure the coordinated silent measurement gaps. The field SilentGapConfig may specify the silent gap configuration and may control setup and/or release of silent gaps in the system for sensing. Table 1 shows exemplary fields and field descriptions in the IE.

TABLE 1

Exemplary SilentGapConfig Field Descriptions

| | |
|---|---|
| UEID_List | |
| | List of UE IDs of UEs in a silent gap. |
| Start_Gap | |
| | Signal to start silent gap patterns to UEs in a silent gap. |
| Gap_Duration | |
| | Signal to start silent gap patterns to UEs in a silent gap. |
| Time_Period | |
| | Time period of silent gap patterns to UEs in a silent gap. |
| Total_Duration | |
| | Total duration of silence for each set of UEs in a silent gap configuration |

Signaling using a MAC control element (MAC CE) may be disclosed. A faster change in the sensing configuration may be achieved through the introduction of a MAC CE sent to multiple UEs, e.g., using a common RNTI for them. A MAC CE may be defined to signal the gap schedule and/or the activation and/or deactivation MAC control element may be used to signal start of gap and/or end of gap. A reserved bit 'R' may be used fir the SuppCell activation and/or deactivation if availability is limited to one SuppCell. If there is more than one SuppCell, more fields may be added. This may help to support asynchronous gaps on multiple SuppCells.

Figure 20:
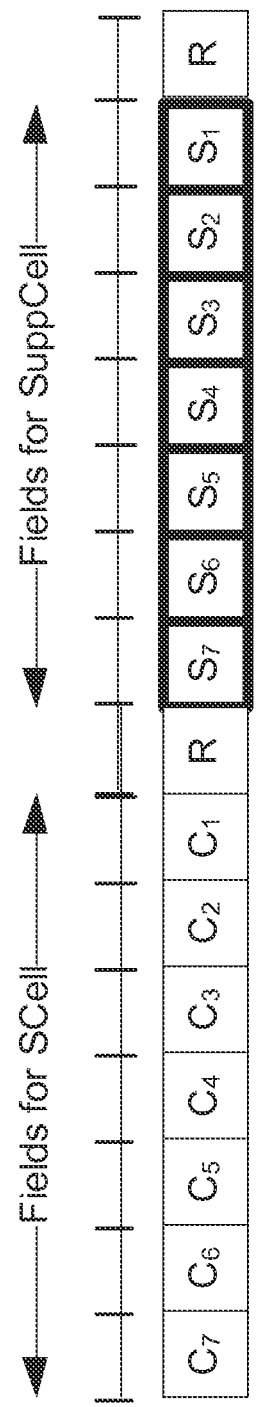
FIG. 20 illustrates an exemplary activation and/or deactivation configuration element.

The activation and/or deactivation MAC control element may have a fixed size and be comprised of a single octet comprising seven C-fields and one R-field. This may be extended to two octets comprising seven C-fields, seven S-fields, and two R-fields. The activation and/or deactivation MAC control element may be defined as follows. A Ci field may indicate an activation and/or deactivation status of the SCell with Cell Index i. The Ci field may be set to "1" to indicate that the SCell with Cell Index i is to be activated. The Ci field may be set to "0" to indicate that the SCell with Cell Index i is to be deactivated. An R field may be a reserved bit, which may be set to "0." An Si field may indicate the activation and/or deactivation status of the SuppCell with Cell Index i. The Si field may be set to "1" to indicate that the SuppCell with Cell Index i is to be activated. The Si field may be set to "0" to indicate that the SuppCell with Cell index i is to be deactivated. FIG. 20 illustrates an exemplary activation and/or deactivation configuration element. The DRX command MAC control element may be used to signal gaps to the UE on the SuppCells.

When using M-GAP, power emission from active clusters into silent clusters may impact the sensing results of UEs in the silent clusters. That is, sensing at one or more UEs in a silent cluster may be impacted by leakage from an adjacent active cluster, while other UEs in the silent cluster may be isolated from the active cluster (e.g., the isolated UEs sensing results may be more reliable). UEs in a silent cluster that are performing sensing may send information to the eNB to signal the reliability of the sensing result (e.g., in addition to reporting sensing results to indicate the presence of primary and/or secondary users). This may allow the eNB to perform collaborative sensing to determine the occupancy of the channel by taking into account a reliability factor of the sensing result from each UE. Exemplary parameters that may be signaled to indicate reliability or a confidence factor in the sensing results may include one or more of the following: a probability of false alarm of sensing algorithm; a probability of detection of primary user (PU); a probability of detection of secondary user (SU); an adjacent cell ID list; and an adjacent cell power list.

Figure 21A:
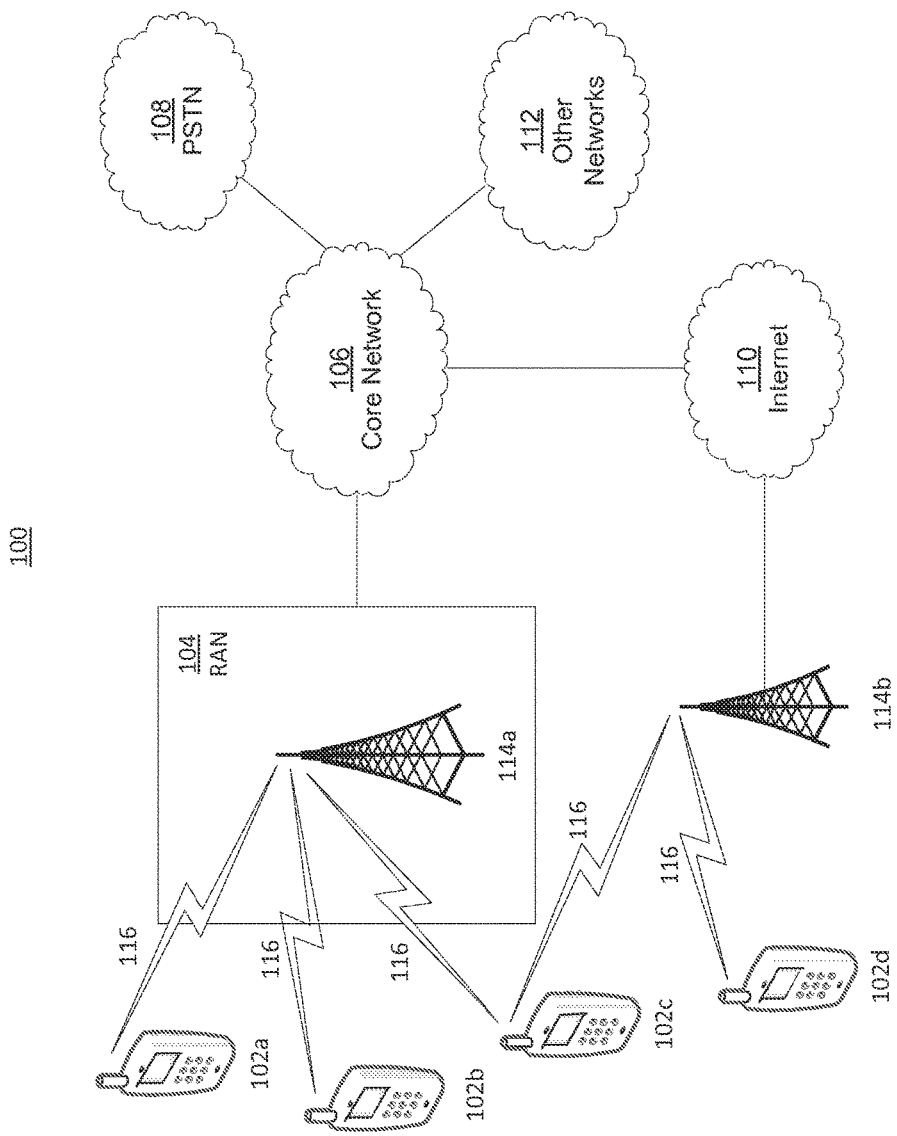
FIG. 21A is a system diagram of an example communications system in which one or more disclosed embodiments may be implemented.

FIG. 21A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 21A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 21A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 21A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 21A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 21A may be configured to communicate with the base station 114a, which may employ a cellular-based radio technology, and with the base station 114b, which may employ an IEEE 802 radio technology.

Figure 21B:
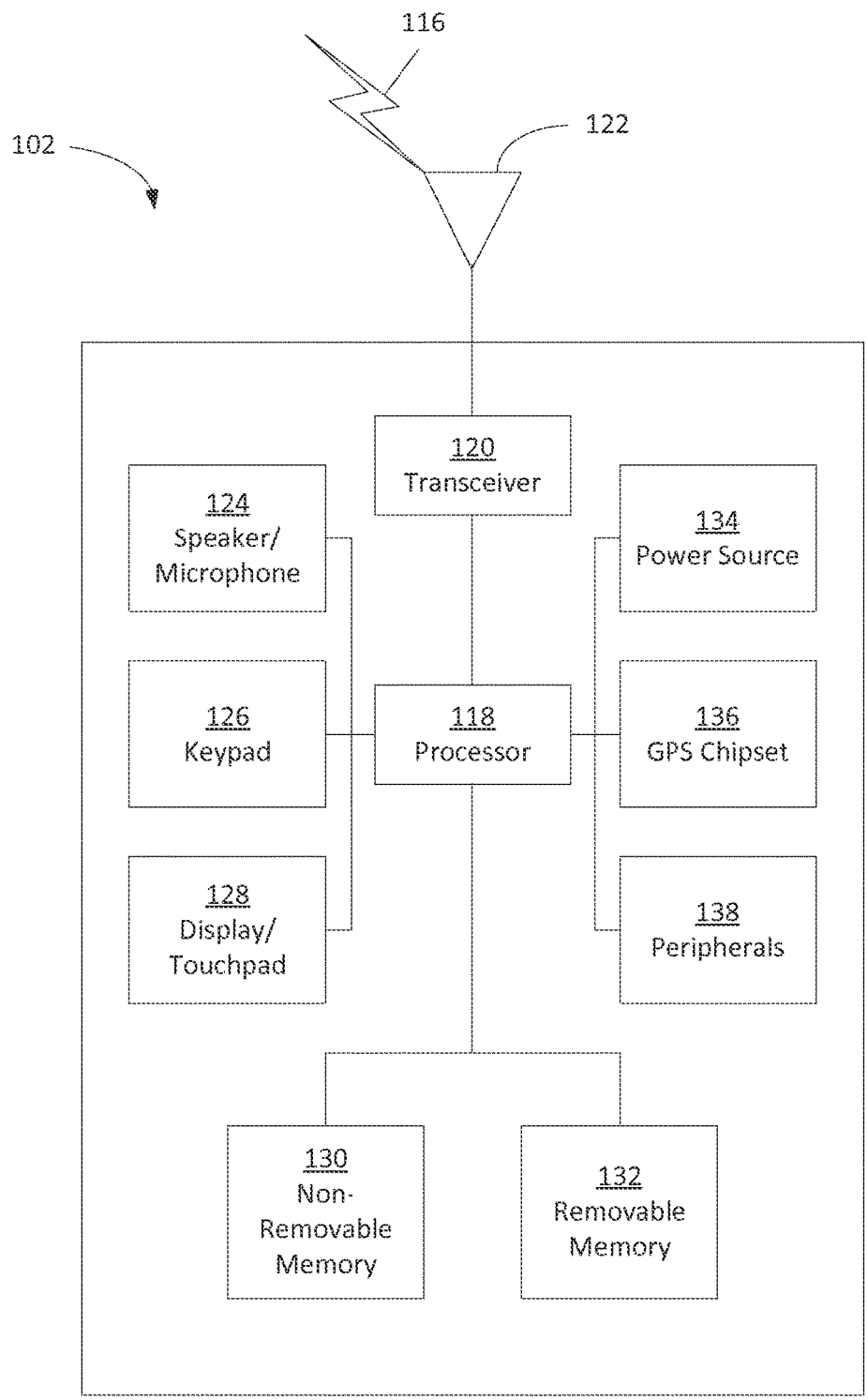
FIG. 21B is a system diagram of an example wireless transmit/receive unit (WTRU) that may be used within the communications system illustrated in FIG. 21A.

FIG. 21B is a system diagram of an example WTRU 102. As shown in FIG. 21B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 21B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 21B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 21C:
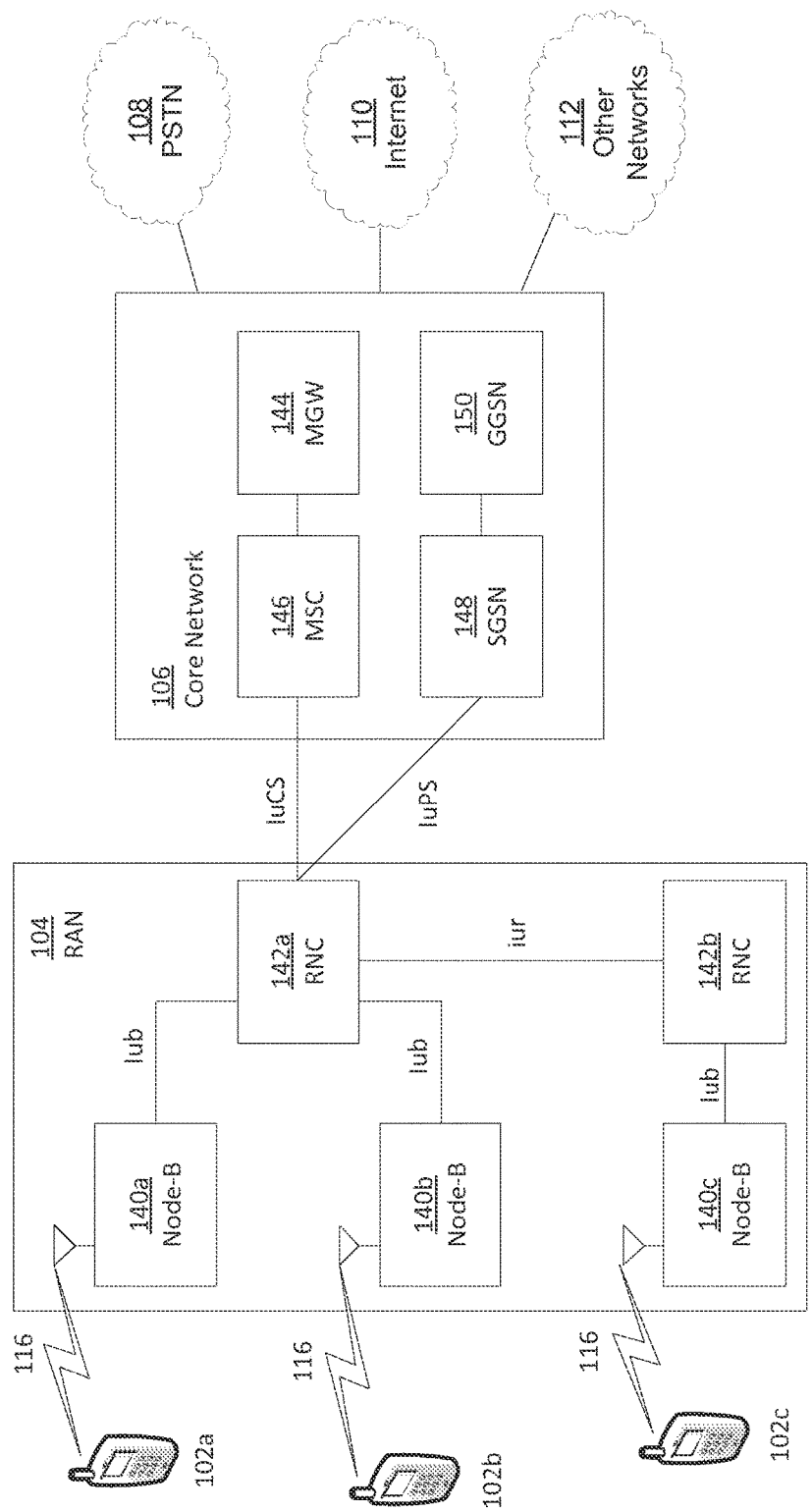
FIG. 21C is a system diagram of an example radio access network and an example core network that may be used within the communications system illustrated in FIG. 21A.

FIG. 21C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 21C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 21C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 21C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 116 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface.

The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 21D:
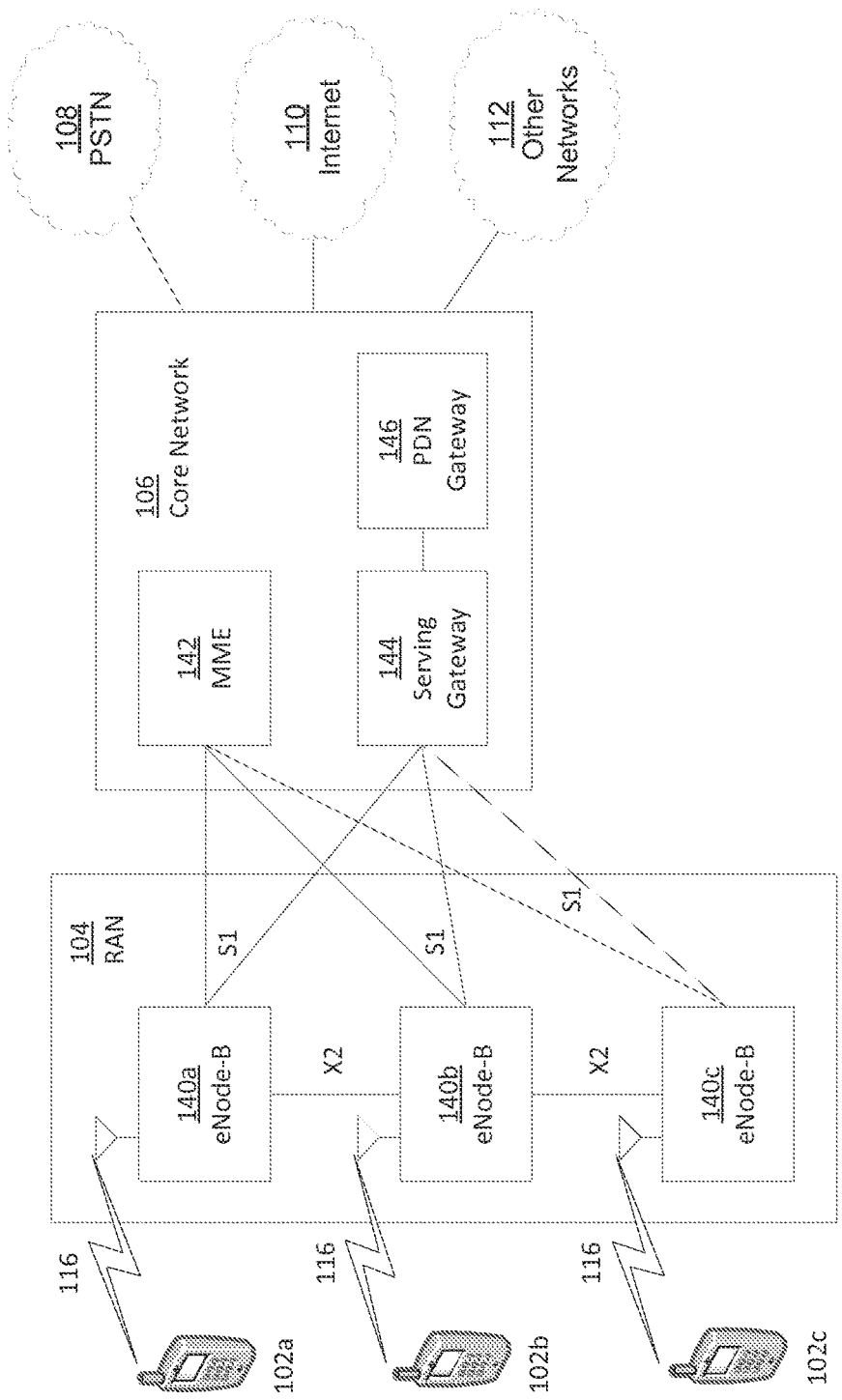
FIG. 21D is a system diagram of an example radio access network and an example core network that may be used within the communications system illustrated in FIG. 21A.

FIG. 21D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 21D, the eNode-Bs 140a, 140b, 140c may communicate with one another over an X2 interface.

The core network 106 shown in FIG. 21D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IF gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 21E:
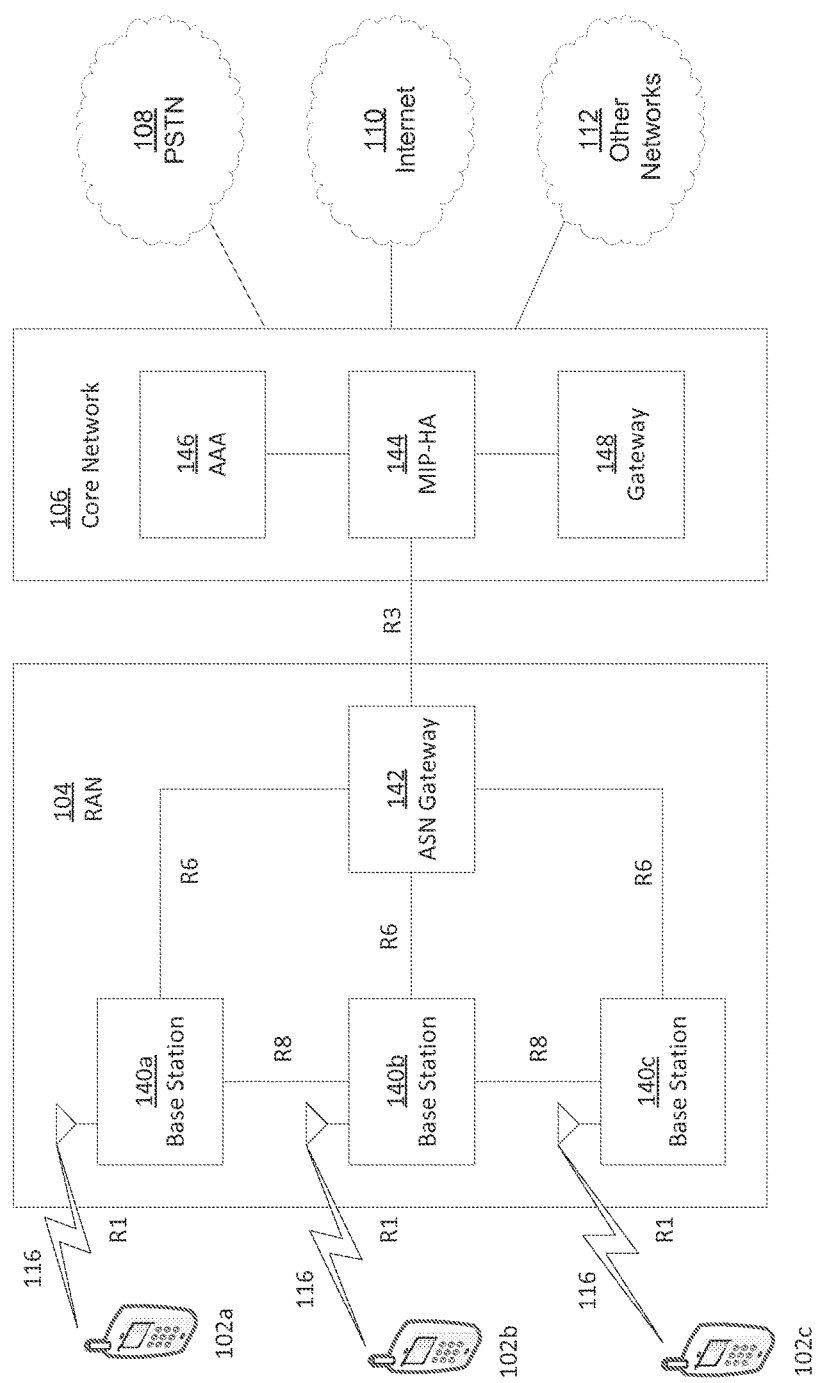
FIG. 21E is a system diagram of an example radio access network and an example core network that may be used within the communications system illustrated in FIG. 21A.

FIG. 21E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 21E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 21E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 21E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method to schedule user equipment (UE) measurements, the method comprising:
receiving information related to a vacant portion of a spectrum associated with a supplementary cell;
identifying, by a network entity, a first cluster of UEs and a second cluster of UEs;
determining a measuring gap schedule relating to the first cluster of UEs and the second cluster of UEs, wherein the measuring gap schedule indicates a respective measurement time for the first cluster of UEs and a respective measurement time for the second cluster of UEs, each respective measurement time indicates that UEs in a corresponding cluster withhold transmitting during the respective measurement time and measure the vacant portion of the spectrum, and wherein during a respective measurement time that is scheduled for the first cluster of UEs, the second cluster of UEs is scheduled to be one of active in accordance with a sequentially quiet measuring pattern or quiet in accordance with a sequentially active measuring pattern; and
sending the measuring gap schedule to the first cluster of UEs and the second cluster of UEs.

2. The method of claim 1, further comprising receiving spectrum measurements associated with the supplementary cell from the first cluster of UEs and the second cluster of UEs in accordance with the measuring gap schedule.

3. The method of claim 1, wherein the measuring gap schedule indicates that the first cluster of UEs and the second cluster of UEs follow the sequentially quiet measuring pattern.

4. The method of claim 3, wherein the measuring gap schedule relates to a plurality of clusters that includes the first and second clusters of UEs, and wherein the sequentially quiet measuring pattern indicates that one cluster of the plurality withholds transmissions during a corresponding respective measurement time and measures the spectrum associated with the supplementary cell while other clusters of the plurality are active.

5. The method of claim 1, wherein the measuring gap schedule indicates that the first cluster of UEs and the second cluster of UEs follow the sequentially active measuring pattern.

6. The method of claim 5, wherein the measuring gap schedule relates to a plurality of clusters that includes the first and second clusters of UEs, and wherein the sequentially active measuring pattern indicates that one cluster of the plurality remains active during a corresponding respective measurement time when other clusters of the plurality are quiet, and wherein the other clusters of the plurality withhold transmissions during the corresponding respective measurement time and measure the spectrum associated with the supplementary cell.

7. The method of claim 1, wherein the measuring gap schedule is sent to the first and second clusters of UEs via one or more RRC messages.

8. The method of claim 1, wherein the measuring gap schedule is sent to the first and second clusters of UEs via one or more MAC CE messages.

9. The method of claim 1, wherein the network entity is one of a Node B, eNode B, home eNode B, and base station.

10. A network entity configured to schedule user equipment (UE) measurements, the network entity configured, at least in part, to:
receive information related to a vacant portion of a spectrum associated with a supplementary cell;
identify a first cluster of UEs and a second cluster of UEs;
determine a measuring gap schedule relating to the first cluster of UEs and the second cluster of UEs, wherein the measuring gap schedule indicates a respective measurement time for the first cluster of UEs and a respective measurement time for the second cluster of UEs, each respective measurement time indicates that UEs in a corresponding cluster withhold transmitting during the respective measurement time and measure the vacant portion of the spectrum, and wherein during a respective measurement time that is scheduled for the first cluster of UEs, the second cluster of UEs is scheduled to be one of active in accordance with a sequentially quiet measuring pattern or quiet in accordance with a sequentially active measuring pattern; and send the measuring gap schedule to the first cluster of UEs and the second cluster of UEs.

11. The network entity of claim 10, wherein the network entity is further configured to receive spectrum measurements of the supplementary cell from the first cluster of UEs and the second cluster of UEs in accordance with the measuring gap schedule.

12. The network entity of claim 10, wherein the measuring gap schedule indicates that the first cluster of UEs and the second cluster of UEs follow the sequentially quiet measuring pattern.

13. The network entity of claim 12, wherein the measuring gap schedule relates to a plurality of clusters that includes the first and second clusters of UEs, and wherein the sequentially quiet measuring pattern indicates that one cluster of the plurality withholds transmissions during a corresponding respective measurement time and measures the spectrum associated with the supplementary cell while other clusters of the plurality are active.

14. The network entity of claim 10, wherein the measuring gap schedule indicates that the first cluster of UEs and the second cluster of UEs follow the sequentially active measuring pattern.

15. The network entity of claim 14, wherein the measuring gap schedule relates to a plurality of clusters that includes the first and second clusters of UEs, and wherein the sequentially active measuring pattern indicates that one cluster of the plurality remains active during a corresponding respective measurement time when other clusters of the plurality are quiet, and wherein the other clusters of the plurality withhold transmissions during the corresponding respective measurement time and measure the spectrum associated with the supplementary cell.

16. The network entity of claim 10, wherein the measuring gap schedule is sent to the first and second clusters of UEs via one or more RRC messages.

17. The network entity of claim 10, wherein the measuring gap schedule is sent to the first and second clusters of UEs via one or more MAC CE messages.

18. The network entity of claim 10, wherein the network entity is one of a Node B, eNode B, home eNode B, and base station.

19. The method of claim 1, wherein the information is received responsive to sending a query for the information to a database associated with the spectrum.

20. The network entity of claim 10, wherein the information is received responsive to the network entity sending a query for the information to a database associated with the spectrum.

* * * * *